(12) United States Patent
Hsu et al.

(10) Patent No.: US 10,932,074 B2
(45) Date of Patent: Feb. 23, 2021

(54) DETACHABLE SMART SPEAKER SYSTEM AND CONTROL METHOD THEREOF

(71) Applicant: Compal Electronics, Inc., Taipei (TW)

(72) Inventors: Chao-Kuei Hsu, Taipei (TW); Yueh-Hsiang Chen, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 16/525,090

(22) Filed: Jul. 29, 2019

(65) Prior Publication Data
US 2020/0413209 A1    Dec. 31, 2020

(30) Foreign Application Priority Data

Jun. 28, 2019  (TW) .................. 108122796

(51) Int. Cl.
*H04R 29/00*   (2006.01)
*H04R 3/04*    (2006.01)
*G06F 16/635*  (2019.01)

(52) U.S. Cl.
CPC ......... *H04R 29/005* (2013.01); *G06F 16/635* (2019.01); *H04R 3/04* (2013.01); *H04R 29/001* (2013.01); *H04R 2420/07* (2013.01)

(58) Field of Classification Search
CPC ...... H04R 29/005; H04R 29/001; H04R 3/04; H04R 2420/07; H04S 7/301; G06F 16/635
See application file for complete search history.

(56) References Cited

U.S. PATENT DOCUMENTS

| 6,859,538 B1* | 2/2005 | Voltz ................. H04R 3/04 381/101 |
| 9,020,153 B2 | 4/2015 | Britt, Jr. |
| 9,247,365 B1 | 1/2016 | Ellis et al. |
| 9,648,422 B2 | 5/2017 | Sheen et al. |
| 9,860,662 B2* | 1/2018 | Jarvis .................. H04R 27/00 |

(Continued)

FOREIGN PATENT DOCUMENTS

| CN | 104240735 A | 12/2014 |
| CN | 108428446 A | 8/2018 |

(Continued)

*Primary Examiner* — Jason R Kurr
(74) *Attorney, Agent, or Firm* — Kirton McConkie; Evan R Witt (57) ABSTRACT

A detachable smart speaker system and a control method thereof are disclosed. The detachable smart speaker system includes a core device and a pairing device. The core device includes a microphone array, a CPU, a wireless communication module, a core bridge element and a database. The microphone array, the core bridge element and the database are connected to the CPU. The database includes plural audio parameter sets. The pairing device includes a speaker, a microcontroller unit, a pairing bridge element, and an identification code. The speaker and the pairing bridge element are connected to the microcontroller unit, respectively. The pairing device is detachably connected to the core device through the pairing bridge element, and a corresponding audio parameter set is to be selected from the audio parameter sets of the database according to the identification code. The core device controls the pairing device according to the corresponding audio parameter set.

6 Claims, 5 Drawing Sheets

(56) References Cited

U.S. PATENT DOCUMENTS

| | | |
|---|---|---|
| 9,913,056 B2 | 3/2018 | Master et al. |
| 9,961,465 B2 * | 5/2018 | Lan ........................ H04R 27/00 |
| 2008/0167860 A1 | 7/2008 | Goller et al. |
| 2009/0147134 A1 * | 6/2009 | Iwamatsu .......... H04N 21/6581 348/484 |
| 2012/0300948 A1 * | 11/2012 | Li ........................... H04R 3/00 381/55 |
| 2015/0156588 A1 * | 6/2015 | Kyriakakis .............. H04R 3/04 381/98 |
| 2015/0195649 A1 * | 7/2015 | Vogt ....................... H04R 27/00 340/4.42 |
| 2019/0158970 A1 * | 5/2019 | Konno ................. H03G 3/3005 |
| 2019/0320260 A1 * | 10/2019 | Alders ................... H04R 1/406 |

FOREIGN PATENT DOCUMENTS

| | | |
|---|---|---|
| CN | 207978113 U | 10/2018 |
| CN | 109348356 A | 2/2019 |
| CN | 109473097 A | 3/2019 |
| TW | M486224 U | 9/2014 |
| TW | I540908 B | 7/2016 |
| TW | M566957 U | 9/2018 |

\* cited by examiner

DETACHABLE SMART SPEAKER SYSTEM AND CONTROL METHOD THEREOF

FIELD OF THE INVENTION

The present disclosure relates to a smart speaker system, and more particularly to a detachable smart speaker system and a control method thereof.

BACKGROUND OF THE INVENTION

A smart speaker is a type of speaker having a voice recognition algorithm function built therein. By integrating a microphone array and an output speaker module, the smart speaker can be utilized to achieve the artificial intelligence (AI) application.

A conventional smart speaker combines a microphone array, an output speaker module, and other basic components in a single structure, for example, in a single housing. In that, it is not conducive to the replacement or repair of the internal components. In the event of, for example, a speaker failure, the entire smart speaker needs to be replaced or repaired. It is costly and time consuming. On the other hand, the entire characteristics of the smart speaker are determined by the input characteristics of the microphone array and the output characteristics of the output speaker module. Users can't further change the different output audio characteristics or enhance the audio quality according to their requirements.

Therefore, there is a need for providing a detachable smart speaker system and a control method thereof to overcome the above drawbacks.

SUMMARY OF THE INVENTION

An object of the present disclosure is to provide a detachable smart speaker system and a control method thereof. A core device having a microphone array and at least one pairing device having a speaker are respectively constructed as two separate devices and can be detachably connected with each other through two bridge elements thereof. When the core device and the pairing device are detachably connected through the bridge elements thereof, an identification code included in the pairing device is identified by the core device to select a corresponding audio parameter set for controlling the pairing device. When the core device and the pairing device having different specifications are detachably connected with each other by the user according to the practical requirements, the core device can optimize the audio parameter set to control the speaker of the pairing device having different specification and connected thereto. It benefits to enhance the practicality of the detachable smart speaker system and improves the convenience of equipment replacement, repair or troubleshooting.

Another object of the present disclosure is to provide a detachable smart speaker system and a control method thereof. The core device having the microphone array can identify, for example, a characteristic curve of a speaker of the pairing device to select a corresponding audio parameter set for control. Thus, when the core device including the microphone array is connected to the pairing devices having speakers of different specifications, the core device can identify each pairing device connected thereto and select its corresponding audio parameter set for control. Furthermore, the core device can selectively control each of the pairing devices connected thereto according to practical requirements. It provides more applications for the detachable smart speaker system.

In accordance with an aspect of the present disclosure, a detachable smart speaker system is disclosed. The detachable smart speaker system includes a core device and at least one pairing device. The core device includes a microphone array, a central processing unit, a wireless communication module, a core bridge element and a database. The microphone array, the wireless communication module, the core bridge element and the database are connected to the central processing unit, respectively. The database includes a plurality of audio parameter sets. The at least one pairing device includes a speaker, a pre-amplifier, a microcontroller unit, a pairing bridge element and an identification code. The speaker is connected to the pre-amplifier. The pre-amplifier and the pairing bridge element are connected to the microcontroller unit, respectively. The at least one pairing device is detachably connected to the core bridge element of the core device through the pairing bridge element. The central processing unit receives the identification code and a corresponding audio parameter set is to be selected from the plurality of audio parameter sets of the database in accordance with the identification code. The core device controls the pairing device in accordance with the corresponding audio parameter set.

In an embodiment, the audio parameter set includes a frequency response value, a sound effect value and a distortion value.

In an embodiment, the at least one pairing device includes a first pairing device and a second pairing device. The pairing bridge element of the first pairing device is detachably connected to the core bridge element of the core device to form a first connection signal strength, and the pairing bridge element of the second pairing device is detachably connected to the core bridge element of the core device to form a second connection signal strength. The core device selectively controls the first pairing device and the second pairing device according to the first connection signal strength and the second connection signal strength.

In an embodiment, the wireless communication module is connected to a cloud system to download and upgrade the plurality of audio parameter sets or the corresponding audio parameter set.

In accordance with another aspect of the present disclosure, a control method of a detachable smart speaker system is provided. The control method includes steps of (a) providing a core device, wherein the core device includes a microphone array, a central processing unit, a wireless communication module, a core bridge element and a database, wherein the microphone array, the wireless communication module, the core bridge element and the database are connected to the central processing unit, respectively, and the database includes a plurality of audio parameter sets; (b) providing at least one pairing device, wherein the at least one pairing device includes a speaker, a pre-amplifier connected to the speaker, a microcontroller unit and a pairing bridge element, wherein the pre-amplifier and the pairing bridge element are connected to the microcontroller unit, respectively; (c) detachably connecting the core bridge element of the core device and the pairing bridge element of the at least one pairing device; (d) determining whether the at least one pairing device comprises an identification code or not; and (e) if the step (d) is yes, receiving the identification code by the central processing unit and selecting a corresponding audio parameter set from the plurality of audio parameter sets of the database in accordance with the identification code, wherein the core device controls the at least one pairing device in accordance with the corresponding audio parameter set.

In an embodiment, the control method further includes steps of (f) if the step (d) is no, sending a testing message from the central processing unit to the at least one pairing device for instructing the speaker of the at least one pairing device to generate a testing audio signal; (g) receiving the testing audio signal by the microphone array of the core device and transmitting the testing audio signal to the central processing unit; and (h) selecting a corresponding audio parameter set from the plurality of audio parameter sets of the database by the central processing unit according to the testing audio signal, wherein the core device controls the at least one pairing device in accordance with the corresponding audio parameter set.

In an embodiment, if the central processing unit fails to select the corresponding audio parameter set from the plurality of audio parameter sets, the step (e) further includes a step of (e1) connecting to a cloud system through the wireless communication module for downloading and upgrading the plurality of audio parameter sets or the corresponding audio parameter set.

In an embodiment, the audio parameter set includes a frequency response value, a sound effect value and a distortion value.

In an embodiment, the at least one pairing device includes a first pairing device and a second pairing device, wherein the pairing bridge element of the first pairing device is detachably connected to the core bridge element of the core device to form a first connection signal strength, and the pairing bridge element of the second pairing device is detachably connected to the core bridge element of the core device to form a second connection signal strength, wherein the core device selectively controls the first pairing device and the second pairing device according to the first connection signal strength and the second connection signal strength.

In an embodiment, the central processing unit executes a microphone array algorithm in accordance with the corresponding audio parameter set for compensation.

In an embodiment, the central processing unit performs a voice recognition calculation according to data calculated and processed by the microphone array algorithm.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
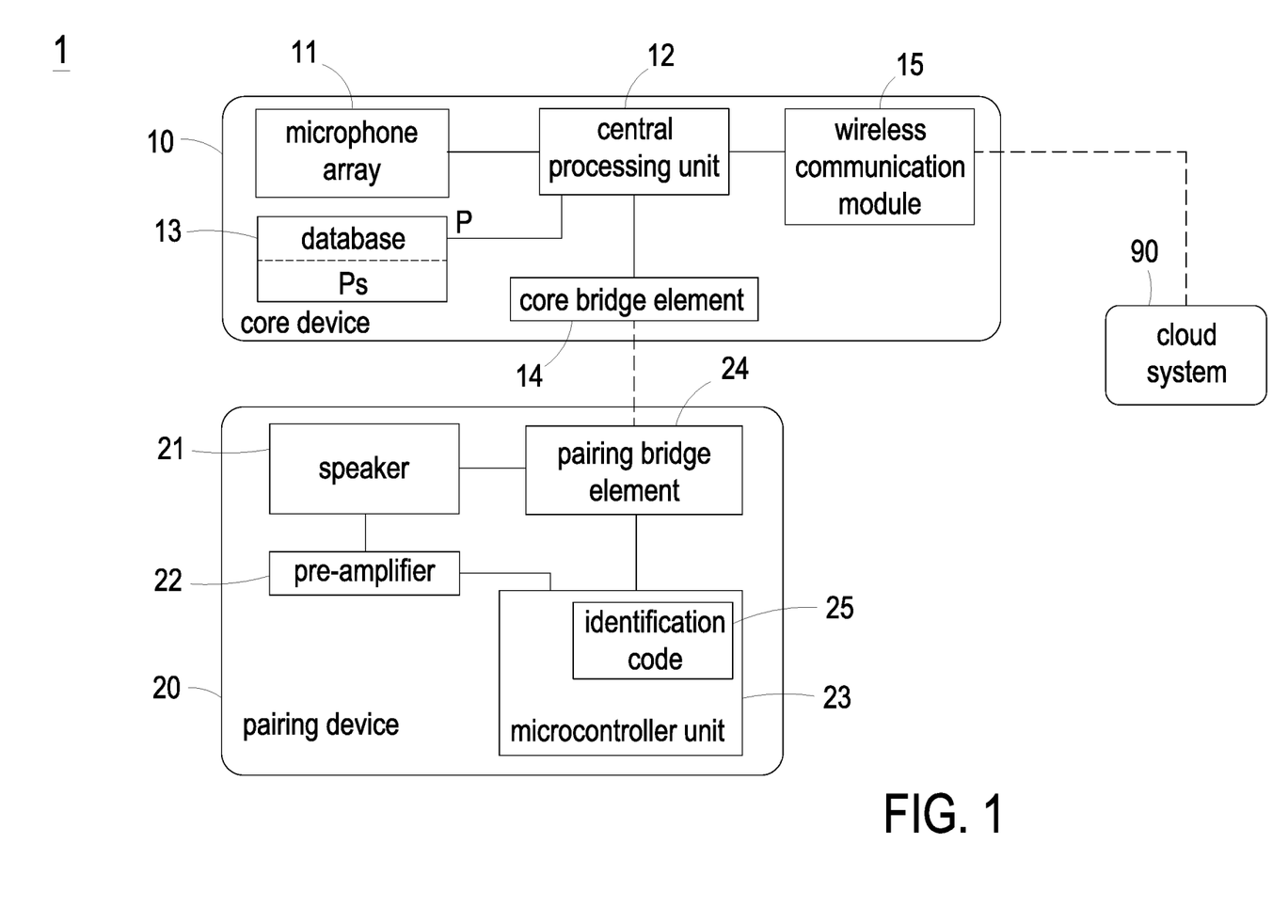
FIG. 1 is a functional block diagram illustrating a detachable smart speaker system according to a first preferred embodiment of the present disclosure.

FIG. 1 is a functional block diagram illustrating a detachable smart speaker system according to a first preferred embodiment of the present disclosure. In the embodiment, the detachable smart speaker system 1 includes a core device 10 and at least one pairing device 20. It is noted that the core device 10 and the pairing device 20 are respectively constructed as two separate devices, and have independent structures. In the embodiment, the shapes, the sizes and the combination of the core device 10 and the pairing device 20 are not limited. Therefore, based on the requirement of use, the core device 10 and the pairing device 20 can be paired with each other to form the entire smart speaker system 1. In the embodiment, the core device 10 includes a microphone array 11, a central processing unit (CPU) 12, a wireless communication module 15, a core bridge element 14 and a database 13. The microphone array 11, the wireless communication module 15, the core bridge element 14 and the database 13 are connected to the central processing unit 12, respectively. Preferably but not exclusively, the database 13 is stored in a memory, and includes a plurality of audio parameter sets Ps. Preferably but not exclusively, each of the audio parameter sets Ps includes a frequency response value, a sound effect value and a distortion value, which are configured to optimize a characteristic curve of a particular speaker. On the other hand, the at least one pairing device 20 includes a speaker 21, a pre-amplifier 22, a microcontroller unit (MCU) 23, a pairing bridge element 24 and an identification code 25. In the embodiment, the speaker 21 is connected to the pre-amplifier 22. The pre-amplifier 22 and the pairing bridge element 24 are connected to the microcontroller unit 23, respectively. In the embodiment, the at least one pairing device 20 is connected to the core bridge element 14 of the core device 10 through the pairing bridge element 24. Preferably but not exclusively, the core bridging element 14 and the pairing bridging element 24 are detachably connected with each other through a wired communication connection or a wireless communication connection, to achieve the detachable connection of the core device 10 and the pairing device 20. The present disclosure is not limited thereto. Preferably but not exclusively, the core bridging element 14 and the pairing bridging element 24 are further integrated with the wireless communication functions, such as Bluetooth or Wi-Fi communication functions, so as to provide a short-distance communication connection. The present disclosure is not limited thereto. Notably, when the at least one pairing device 20 is detachably connected to the core bridge element 14 of the core device 10 through the pairing bridge element 24, the central processing unit 12 of the core device 10 receives the identification code 25 from the pairing device 20 through the core bridge element 14 and the pairing bridge element 24. Certainly, the type and the storage method of the identification code 25 are not limited in the present disclosure. Preferably but not exclusively, the identification code 25 can be, for example, a mechanical code, which is pre-stored in the microcontroller unit 23 or other electronic device, or stored in another storage unit (for example, Flash or Rom), and the present disclosure is not limited thereto. In an embodiment, the identification code 25 corresponds to the models of the speaker 21, the pre-amplifier 22 or the microcontroller unit 23. Preferably but not exclusively, the pairing device 20 having the same speaker 21 includes the same or similar identification code 25. The present disclosure is limited thereto. In the embodiment, when the central processing unit 12 of the core device 10 receives the identification code 25 from the pairing device 20, the pairing device 20 is identified by the core device 10 and a corresponding audio parameter set P is to be selected from the plurality of audio parameter sets Ps of the database 13 in accordance with the identification code 25. The core device 10 controls the pairing device 20 in accordance with the corresponding audio parameter set P.

In the embodiment, the corresponding audio parameter set P includes a frequency response value, a sound effect value and a distortion value, which are for example configured to optimize a characteristic curve of the speaker 21 of the pairing device 20 for facilitating the core device 10 to control the pairing device 20. In an embodiment, the pairing devices 20 having the same speakers 21 correspond to same characteristic curve, and for example include the same or similar identification code 25. The present disclosure is not limited thereto. In the embodiment, the central processing unit 12 of the core device 10 can execute a microphone array algorithm for example in accordance with the corresponding audio parameter set P to calculate and process the audio data received through the microphone array 11 for compensation. In addition, the central processing unit 12 further performs a voice recognition calculation according to the data calculated and processed by the microphone array algorithm. In other words, when the detachable smart speaker system 1 of the present disclosure is applied to the voice recognition calculation, the central processing unit 12 controls the speaker 21 of the pairing device 20 in accordance with the corresponding audio parameter set selected for optimization. When the microphone array 11 performs an audio reception, the core device 10 recognizes the frequency response value and the distortion value of the pairing device 20 matched, and can completely filter out the audio generated by the speaker 21 in the pairing device 20, to eliminate the interface of feedback (echo), thereby improving the accuracy of the voice recognition calculation. Certainly, in the embodiment, the central processing unit 12 of the core device 10 controls the pairing device 20 in accordance with the corresponding audio parameter set P, and it facilitates the combination of the speaker 21, the pre-amplifier 22 and the microcontroller unit 23 to achieve the optimization of the frequency response and the audio effect. It will not be redundantly described hereafter.

On the other hand, in the embodiment, the core device 10 includes the wireless communication module 15, which can be for example but not limited to a long term evolution (LTE) module, connected to a cloud system 90 to download and upgrade the plurality of audio parameter sets Ps or the corresponding audio parameter set P. In other embodiments, the core device 10 and the cloud system 90 further execute processes of uplink data or downlink data through the wireless communication module 15, to access the cloud information and services. The present disclosure is not limited thereto.

Figure 2:
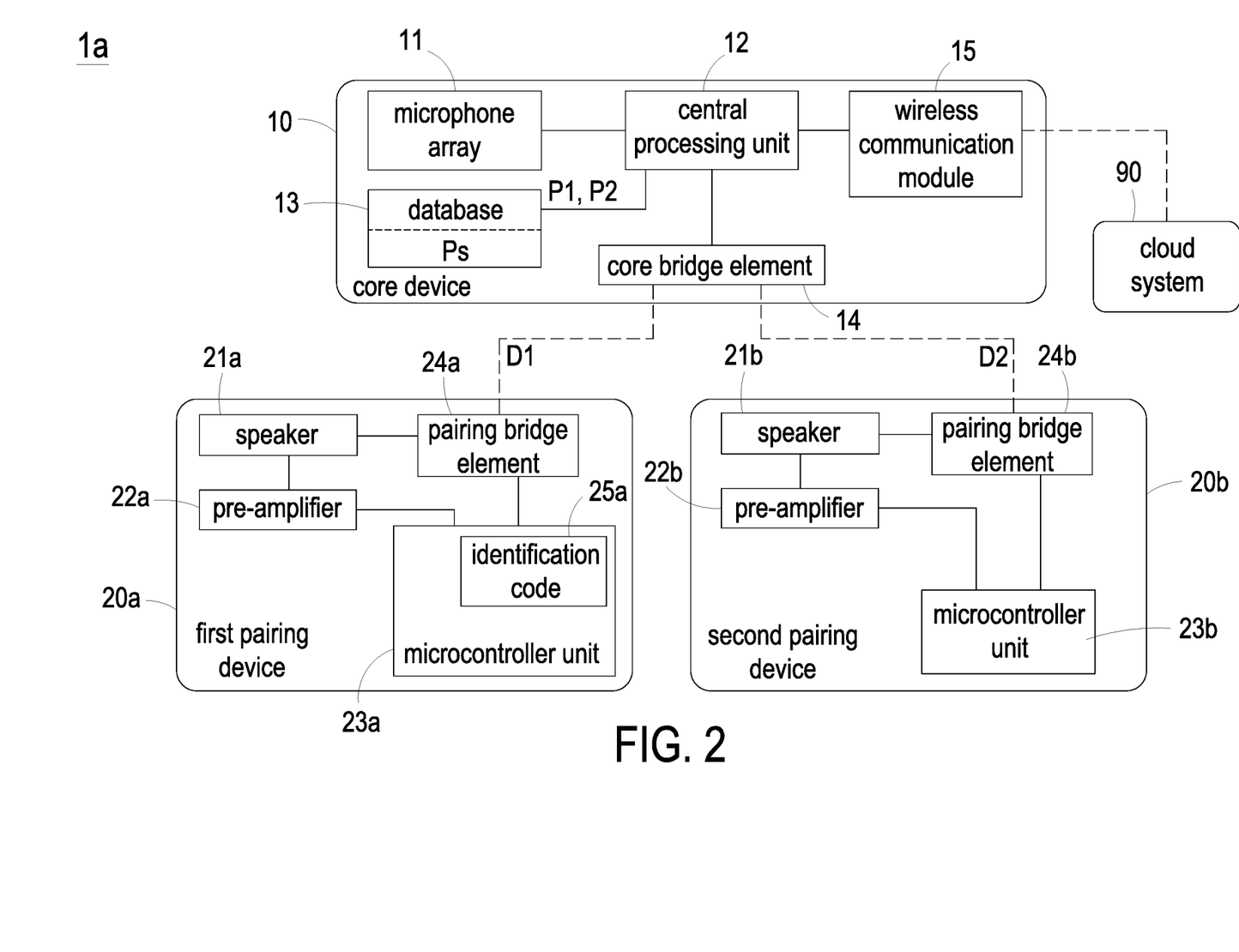
FIG. 2 is a functional block diagram illustrating a detachable smart speaker system according to a second preferred embodiment of the present disclosure.

FIG. 2 is a functional block diagram illustrating a detachable smart speaker system according to a second preferred embodiment of the present disclosure. In the embodiment, the structures, elements and functions of the detachable smart speaker system 1a are similar to those of the detachable smart speaker system 1 in FIG. 1, and are not redundantly described herein. In the embodiment, the detachable smart speak system 1a further includes a first pairing device 20a and a second pairing device 20b. Preferably but not exclusively, the first pairing device 20a is similar to the pairing device 20 in the forgoing first embodiment, and includes a speaker 21a, a pre-amplifier 22a, a microcontroller unit (MCU) 23a, a pairing bridge element 24a and an identification code 25a. Preferably but not exclusively, the second pairing device 20b is an additional pairing device, and includes a speaker 21b, a pre-amplifier 22b, a microcontroller unit 23b and a pairing bridge element 24b, but the second pairing device 20b doesn't have an identification code pre-stored therein. In the embodiment, the pairing bridge element 24a of the first pairing device 20a is detachably connected to the core bridge element 14 of the core device 10 to form a first connection signal strength D1. The connection and identification between the first pairing device 20a and the core device 10 are similar to those described in the forgoing first embodiment. When the central processing unit 12 of the core device 10 receives the identification code 25a from the first pairing device 20a, the first pairing device 20a is identified by the core device 10 and a corresponding audio parameter set P1 is to be selected from the plurality of audio parameter sets Ps of the database 13 in accordance with the identification code 25a. The core device 10 controls the first pairing device 20a in accordance with the corresponding audio parameter set P1. Notably, the pairing bridge element 24b of the second pairing device 20b is detachably connected to the core bridge element 14 of the core device 10 to form a second connection signal strength D2. Since the second pairing device 20b is an additional pairing device without an identification code, when the pairing bridge element 24b of the second pairing device 20b is detachably connected to the core bridge element 14 of the core device 10, the central processing unit 12 of the core device 10 sends for example a testing message to the second pairing device 20b and the speaker 21b of the second pairing device 20b generates a testing audio signal. Meanwhile, the testing audio signal is received by the microphone array 11 of the core device 10 and transmitted to the central processing unit 12. Moreover, a corresponding audio parameter set P2 is to be selected from the plurality of audio parameter sets Ps of the database 13. The core device 10 controls the second pairing device 20b in accordance with the corresponding audio parameter set P2. In an embodiment, if a corresponding audio parameter set P2 fails to be selected from the database 13, the central processing unit 12 of the core device 10 can further analyze the testing audio signal, and controls the second pairing device 20b according to the analyzed result.

In the embodiment, the core device 10 can be connected to the first pairing device 20a and the second pairing device 20b, respectively, by for example a wireless communication connection. In the embodiment, the core device 10 is connected with the first pairing device 20a and the second pairing device 20b to form the first connection signal strength D1 and the second connection signal strength D2, and the core device 10 can selectively control the first pairing device 20a and the second pairing device according to the first connection signal strength D1 and the second connection signal strength D2. Preferably but not exclusively, when the first connection signal strength D1 is greater than the second connection signal strength D2, the core device 10 outputs the audio signal only through the speaker 21a of the first pairing device 20a, but disconnects the second pairing device 20b. In other embodiments, the core device 10 can further determine the relative distances among the first pairing device 20a, the second pairing device 20b and the core device 10 according to the magnitude of the first connection signal strength D1 and the second connection signal strength D2. Furthermore, the output audio signals of the speaker 21a of the first pairing device 20a and the speaker 21b of the second pairing device 20b are adjusted. The present disclosure is not limited thereto and not redundantly described herein. It is noted that the number and type of the first pairing device 20a and the second pairing device 20b, detachable connected to the core device 10, in the detachable smart speaker system 1a are exemplified merely, and adjustable according to the practical requirements by the user. The present disclosure is not limited thereto.

As described in the foregoing embodiment, in the detachable smart speaker system 1a of the present disclosure, the user can detachably connect the core device 10 with at least one of the first pairing device 20a and the second pairing device 20b according to the practical requirements. For example, the core device 10 and the first pairing device 20a may be initially combined for sale, and the user may additionally add the second pairing device 20b to add the number of matched devices or replace them. In other words, the detachable smart speaker system 1a may include the speakers 21a of the first pairing device 20a and the speaker 21b of the second pairing device 20b in different specifications and numbers. The core device 10 of the present disclosure can optimize the audio parameter set to control the speaker 21a of the first pairing device 20a and the speaker 21b of the second pairing device 20b having different specifications and connected thereto. It benefits to enhance the practicality of the detachable smart speaker system 1a and improves the convenience of equipment replacement, repair or troubleshooting.

Figure 3:
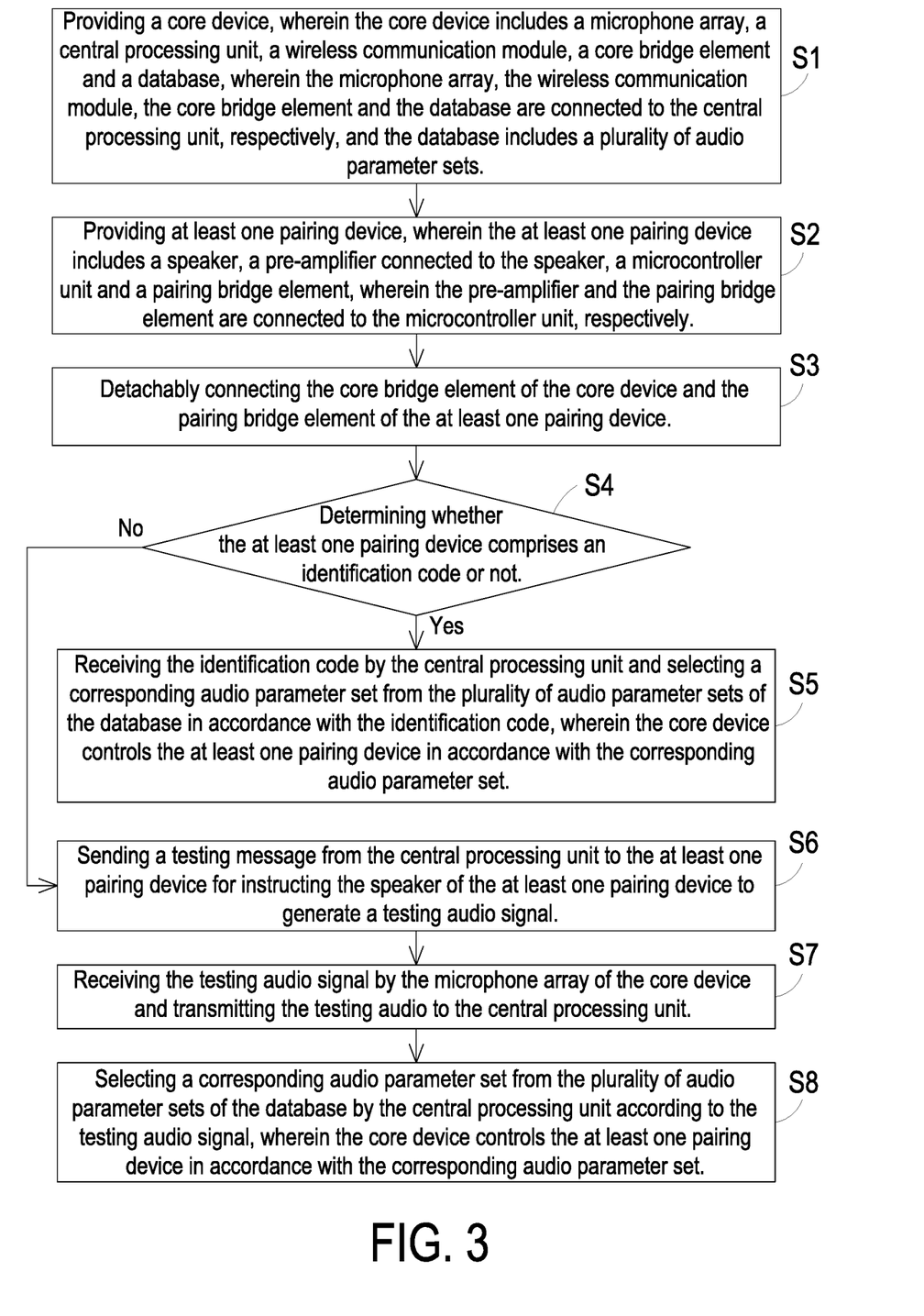
FIG. 3 is a flow chart of a control method of a detachable smart speaker system according to a first preferred embodiment of the present disclosure.

Based on the configuration of the detachable smart speaker system 1a in the forgoing embodiment, a control method of a detachable smart speaker system is further provided in the present disclosure. FIG. 3 is a flow chart of a control method of a detachable smart speaker system according to a first preferred embodiment of the present disclosure. Please refer to FIGS. 2 and 3. Firstly, in the step S1, a core device 10 is provided. The core device 10 includes a microphone array 11, a central processing unit 12, a wireless communication module 15, a core bridge element 14 and a database 13. The microphone array 11, the wireless communication module 15, the core bridge element 14 and the database 13 are connected to the central processing unit 12, respectively. In the embodiment, the database 13 includes a plurality of audio parameter sets Ps. Then, in the step S2, at least one first pairing device 20a or/and at least one second pairing device 20b are provided. In the embodiment, the first pairing device 20a includes a speaker 21a, a pre-amplifier 22a, a microcontroller unit 23a, a pairing bridge element 24a and an identification code 25a. The speaker 21a is connected to the pre-amplifier 22a. The pre-amplifier 22a and the pairing bridge element 24a are connected to the microcontroller unit 23a, respectively. The second pairing device 20b includes a speaker 21b, a pre-amplifier 22b, a microcontroller unit 23b and a pairing bridge element 24b. The speaker 21b is connected to the pre-amplifier 22b. The pre-amplifier 22b and the pairing bridge element 24b are connected to the microcontroller unit 23b, respectively. Thereafter, in the step S3, the core bridge element 14 of the core device 10 is detachably connected to the pairing bridge element 24a of the first pairing device 20a or/and the pairing bridge element 24b of the second pairing device 20b through a wired communication connection or a wireless communication connection. In the step S4, the core device 10 determines if the at least one first pairing device 20a or/and the at least one second pairing device 20b connected thereto include an identification code. In the step S5, if the core device 10 determines that the at least one first pairing device 20a includes the identification code 25a in the step S4, the central processing unit 12 of the core device 10 receives the identification code 25a and makes sure that a corresponding audio parameter set P1 is to be selected from the plurality of audio parameter sets Ps of the database 13 in accordance with the identification code 25a. Consequently, the core device 10 controls the first pairing device 20a in accordance with the corresponding audio parameter set P1.

On the other hand, in the step S6, if the core device 10 determines that the second pairing device 20b doesn't have an identification code, the central processing unit 12 of the core device 10 sends a testing message to the second pairing device 20b through the core bridge element 14 and the pairing bridge element 24b, to instruct the speaker 21b of the second pairing device 20b to generate a testing audio signal Then, in the step S7, the testing audio signal generated by the speaker 21b of the second pairing device 20b is received by the microphone array 11 of the core device 10 and transmitted to the central processing unit 12. Finally, in the step S8, a corresponding audio parameter set P2 is to be selected form the plurality of audio parameter sets Ps of the database 13 according to the testing audio signal by the central processing unit 12 of the core device 10. In the embodiment, the core device 10 controls the second pairing device 20b according to the corresponding audio parameter set P2. Notably, the type and the number of the first pairing device 20a or/and the second pairing device 20b, detachable connected to the core device 10, in the detachable smart speaker system 1a are adjustable according to the practical requirements. When the core device 10 is detachably connected to any one of the first pairing device 20a and the second pairing device 20b, it achieves the identification and the corresponding audio parameter set P1 corresponding to the first pairing device 20a or/and the corresponding audio parameter set P2 corresponding to the second pairing device 20b are selected. Certainly, the core device 10 can selectively control the first pairing device 20a or/and the second pairing device 20b according to the practical requirements. It provides more applications for the detachable smart speaker system 1a, but not redundantly described herein.

Figure 4A:
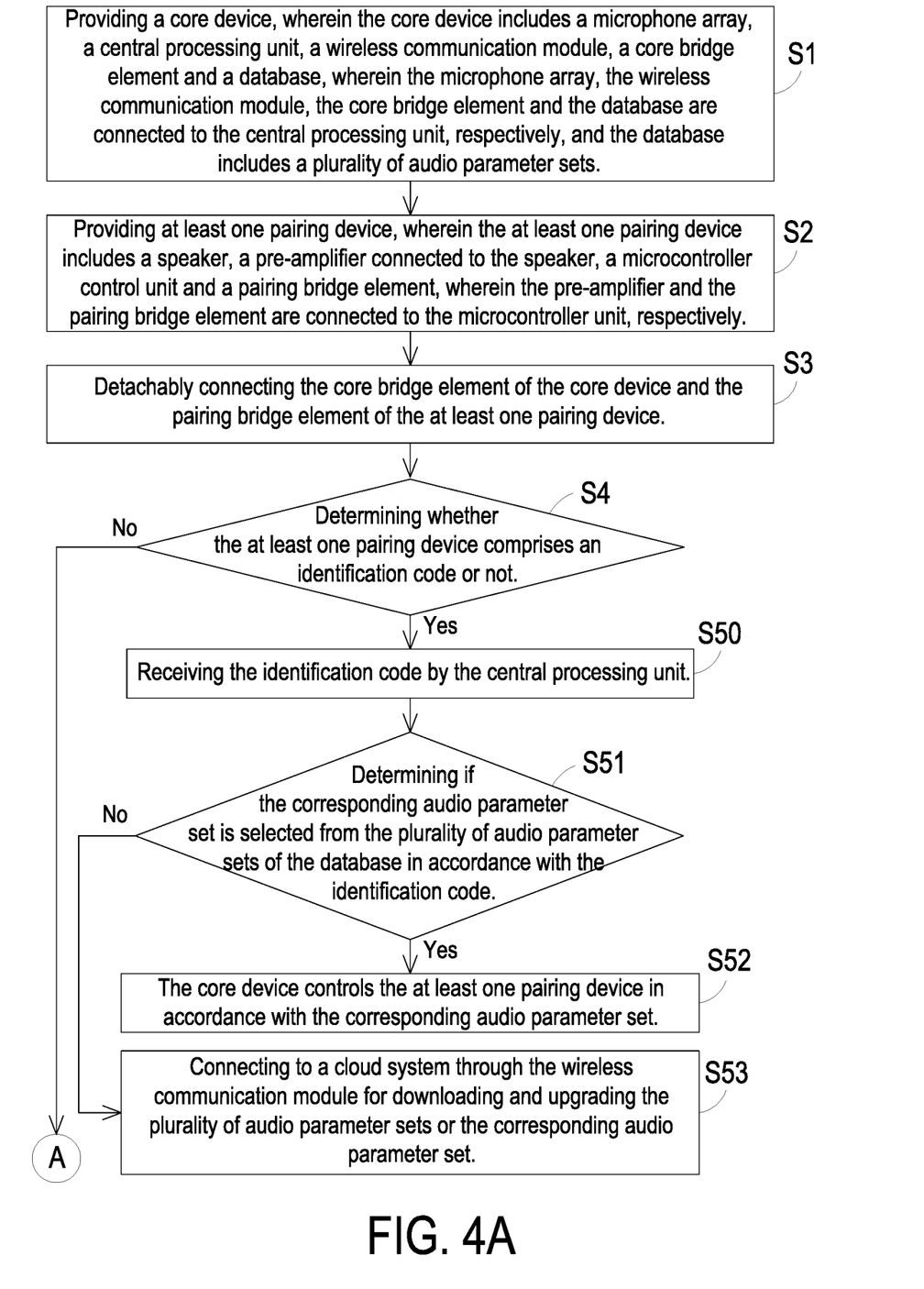
FIGS. 4A and 4B are a flow chart of a control method of a detachable smart speaker system according to a second preferred embodiment of the present disclosure.
Figure 4B:
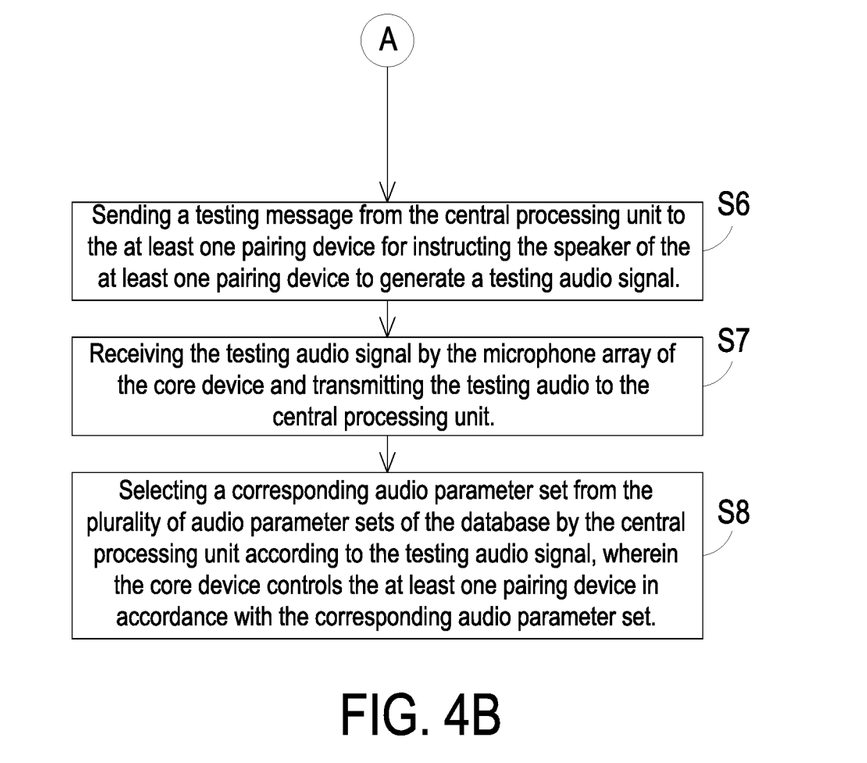

Notably, the core device 10 and the pairing device 20 are selectively paired and cooperated with each other according to the practical requirements, and assembled into an entire smart speaker system 1. In the embodiment, when the core device 10 and the pairing device 20 are assembled together, the core device 10 can further determine if a corresponding audio parameter set P is to be selected from the plurality of audio parameter sets Ps of the database 13 in accordance with the identification code 25 received, so as to control the pairing device 20 connected thereto in accordance with the corresponding audio parameter set P. FIGS. 4A and 4B are a flow chart of a control method of a detachable smart speaker system according to a second preferred embodiment of the present disclosure. Please refer to FIGS. 1, 3, 4A and 4B. In the embodiment, the control method of the detachable smart speaker system 1 is similar to the control method of the detachable smart speaker system 1 in FIG. 3. The structures, elements and functions thereof are similar and not redundantly described herein. In the embodiment, the step S5 of FIG. 3 is further replaced by the steps S50 to S53 of FIG. 4A. In the embodiment, when the core device 10 is connected to the pairing device 20 and the steps S1 to S4 are performed and completed, it is determined that the pairing device 20 includes the identification code 25, but the pairing device 20 compared with the core device 10 may be an upgraded product. In that, the pairing device 20 may not be able to implement the process of selecting a corresponding audio parameter set P from the plurality of audio parameter sets Ps of the database 13 in accordance with the identification code 25. In the embodiment, in the step S50, the central processing unit 12 of the core device 10 receives the identification code 25 from the pairing device 20. Then, in the step S51, the core device 10 determines if the corresponding audio parameter set P is to be selected from the plurality of audio parameter sets Ps of the database 13 in accordance with the identification code 25 received. If the corresponding audio parameter set P is to be selected from the plurality of audio parameter sets Ps of the database 13 in accordance with the identification code 25, the central processing unit 12 of the core device 10 controls the pairing device 20 in accordance with the corresponding audio parameter set P, as shown in the step S52. On the contrary, if the corresponding audio parameter set P is not selected from the plurality of audio parameter sets Ps of the database 13 in accordance with the identification code 25, the wireless communication module 15 of the core device 10 is connected to a cloud system 90 to download and upgrade the plurality of audio parameter sets Ps for selecting the corresponding audio parameter P later, or download and upgrade the corresponding audio parameter set P directly. Thus, it implements that the core device 10 controls the pairing device 20 in accordance with the corresponding audio parameter set P.

In summary, the present disclosure provides a detachable smart speaker system and a control method thereof. A core device including a microphone array and at least one pairing device having a speaker are respectively constructed as two separate devices and can be detachably connected with each other through two bridge elements thereof. When the core device and the pairing device are detachably connected through the bridge elements thereof, an identification code included in the pairing device is identified by the core device to select a corresponding audio parameter set for controlling the pairing device. When the core device and the pairing device having different specifications are detachably connected with each other by the user according to the practical requirements, the core device can optimize the audio parameter set to control the speaker of the pairing device having different specification and connected thereto. It benefits to enhance the practicality of the detachable smart speaker system and improves the convenience of equipment replacement, repair or troubleshooting. In addition, the core device including the microphone array can identify, for example, a characteristic curve of a speaker of the pairing device to select a corresponding audio parameter set for control. Thus, when the core device including the microphone array is connected to a pairing device including speakers of different specifications, the core device can identify each pairing device connected thereto and select its corresponding audio parameter set for control. Furthermore, the core device can selectively control each of the pairing devices connected thereto according to practical requirements. It provides more applications for the detachable smart speaker system.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of a detachable smart speaker system, comprising steps of:
   (a) providing a core device, wherein the core device comprises:
      a microphone array;
      a central processing unit;
      a wireless communication module;
      a core bridge element; and
      a database, wherein the microphone array, the wireless communication module, the core bridge element and the database are connected to the central processing unit, respectively, and the database comprises a plurality of audio parameter sets;
   (b) providing at least one pairing device, wherein the at least one pairing device comprises:
      a speaker;
      a pre-amplifier connected to the speaker;
      a microcontroller unit; and
      a pairing bridge element, wherein the pre-amplifier and the pairing bridge element are connected to the microcontroller unit, respectively;
   (c) detachably connecting the core bridge element of the core device and the pairing bridge element of the at least one pairing device;
   (d) determining whether the at least one pairing device comprises an identification code or not;
   (e) if the step (d) is yes, receiving the identification code by the central processing unit and selecting a corresponding audio parameter set from the plurality of audio parameter sets of the database in accordance with the identification code, wherein the core device controls the at least one pairing device in accordance with the corresponding audio parameter set;
   (f) if the step (d) is no, sending a testing message from the central processing unit to the at least one pairing device for instructing the speaker of the at least one pairing device to generate a testing audio signal,
   (g) receiving the testing audio signal by the microphone array of the core device and transmitting the testing audio signal to the central processing unit; and
   (h) selecting a corresponding audio parameter set from the plurality of audio parameter sets of the database by the central processing unit according to the testing audio signal, wherein the core device controls the at least one pairing device in accordance with the corresponding audio parameter set.

2. The control method of the detachable smart speaker system according to claim 1, wherein if the central processing unit fails to select the corresponding audio parameter set from the plurality of audio parameter sets, the step (e) further comprises a step of:
   (e1) connecting to a cloud system through the wireless communication module for downloading and upgrading the plurality of audio parameter sets or the corresponding audio parameter set.

3. The control method of the detachable smart speaker system according to claim 1, wherein the audio parameter set comprises a frequency response value, a sound effect value and a distortion value.

4. The control method of the detachable smart speaker system according to claim 1, wherein the at least one pairing device comprises a first pairing device and a second pairing device, wherein the pairing bridge element of the first pairing device is detachably connected to the core bridge element of the core device to form a first connection signal strength, and the pairing bridge element of the second pairing device is detachably connected to the core bridge element of the core device to form a second connection signal strength, wherein the core device selectively controls the first pairing device and the second pairing device according to the first connection signal strength and the second connection signal strength.

5. The control method of the detachable smart speaker system according to claim 1, wherein the central processing unit executes a microphone array algorithm in accordance with the corresponding audio parameter set for compensation.

6. The control method of the detachable smart speaker system according to claim 5, wherein the central processing unit performs a voice recognition calculation according to data calculated and processed by the microphone array algorithm.

* * * * *